No. 680,228. Patented Aug. 13, 1901.
J. COUSTON & J. FINLAYSON.
APPARATUS FOR CALKING AND CUTTING PIPE.
(Application filed June 13, 1900.)
(No Model.) 2 Sheets—Sheet 1.
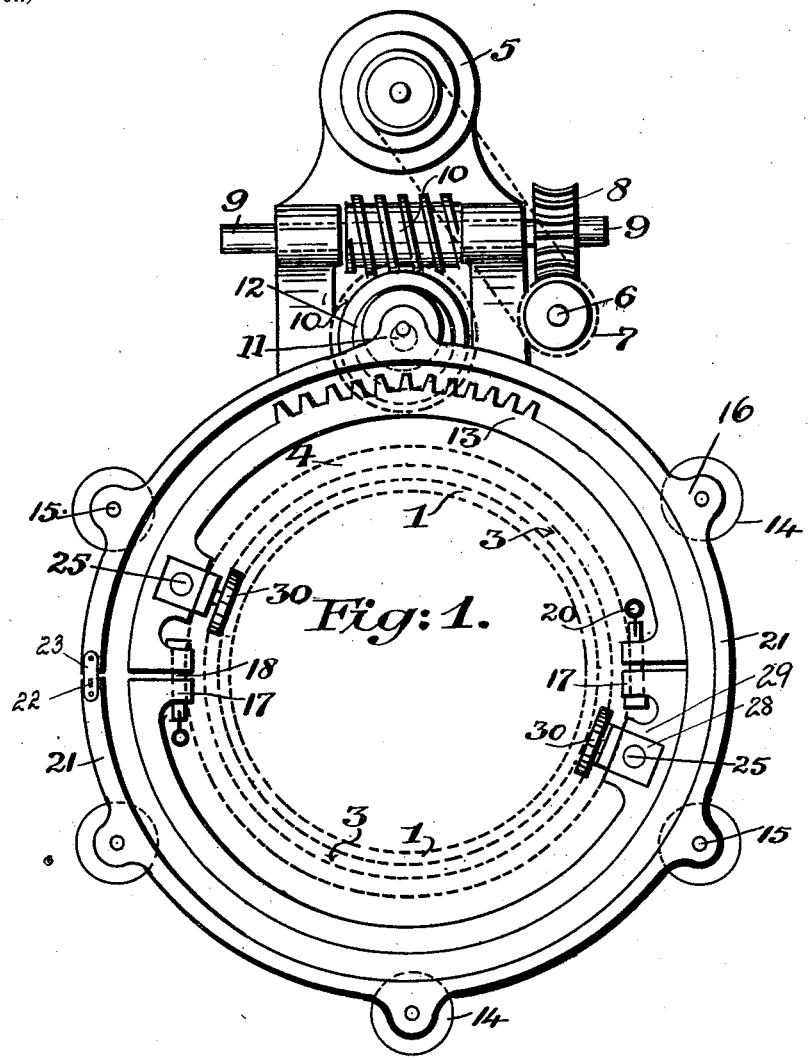
Fig: 1.
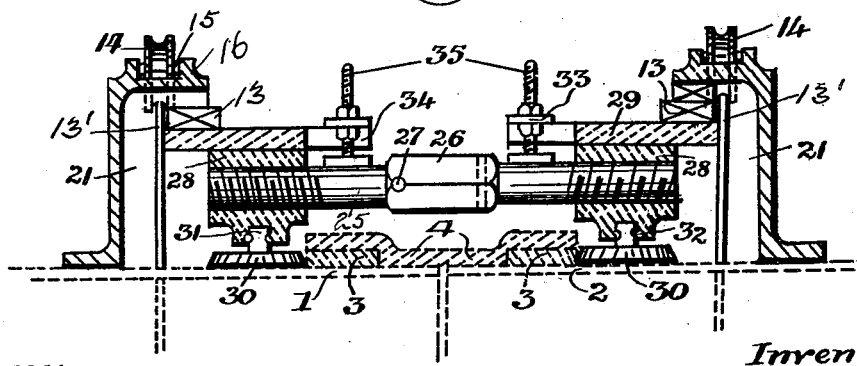
Fig: 7.
Witnesses:— Inventors No. 680,228. Patented Aug. 13, 1901.
J. COUSTON & J. FINLAYSON.
APPARATUS FOR CALKING AND CUTTING PIPE.
(Application filed June 13, 1900.)
(No Model.) 2 Sheets—Sheet 2.
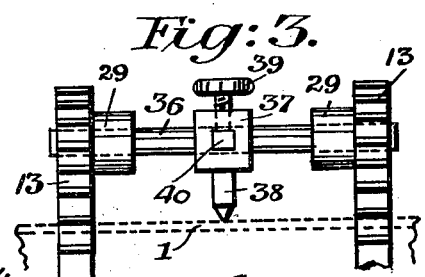
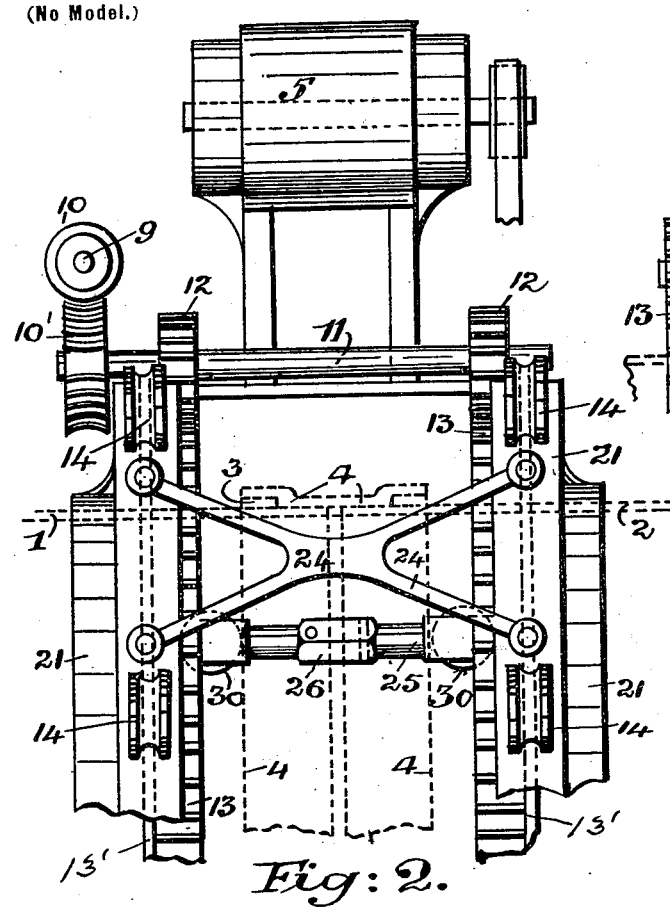
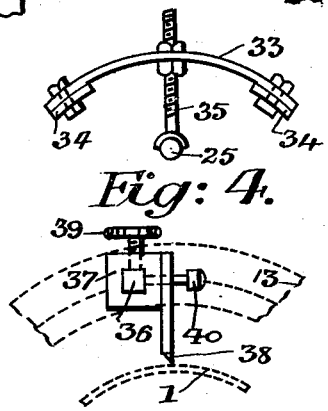
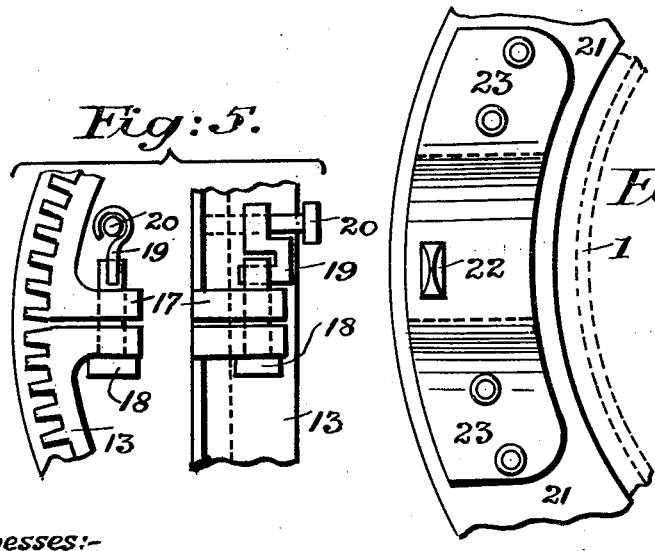
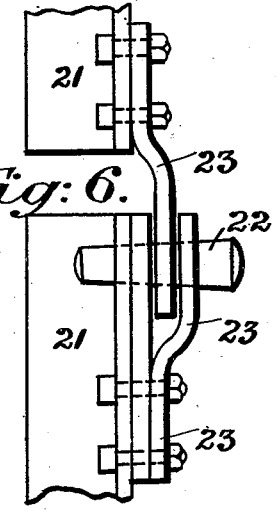
Witnesses:
Inventors
James Couston
James Finlayson
By Richardson
ATTORNEYS
THE NORRIS PETERS CO., PHOTO-LITHO., WASHINGTON, D. C.

UNITED STATES PATENT OFFICE.

JAMES COUSTON AND JAMES FINLAYSON, OF PERTH, WESTERN AUSTRALIA.

APPARATUS FOR CALKING AND CUTTING PIPE.

SPECIFICATION forming part of Letters Patent No. 680,228, dated August 13, 1901.

Application filed June 13, 1900. Serial No. 20,171. (No model.)

*To all whom it may concern:*

Be it known that we, JAMES COUSTON and JAMES FINLAYSON, of Craig Lusker, Lincoln street, Perth, Western Australia, have invented certain new and useful Improvements in Apparatus for Calking or Cutting Pipe; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention of a calking-machine has been principally designed so as to effectively and speedily calk or make secure from leakage the lead or other joints of water or other pipes. The machine is mounted upon the pipe in order that the calking operation will take place when and where the pipes are placed permanently in their position.

The machine is so arranged and placed that the calking-tools run around the faces of the joints and do work from opposite sides, so that a double compression is obtained from opposite points and in a direct or straight line.

The appliance is operated by suitable gearing, which is mounted upon the frame of the calking-machine, which latter is clamped onto the pipe that is desired to be jointed. This gearing in its turn engages with two circumferential spur or toothed rims which surround the pipe, and such toothed peripheral rims in their rotation carry the transverse bars, on which are mounted the calking or cutting tools, as the case may be. The calking-tools are in the form of small rollers preferably milled on their peripheral faces. Means are provided whereby the necessary and inwardly-directed compression is given to the calking-tools, such means consisting of transverse union bars formed with left and right handed screw-threads which engage into correspondingly-threaded slide-blocks. These latter blocks carry the calking-rollers. By a slight and obvious addition to the machine it is converted into a pipe-cutter, in which case the cutting-tools are placed in a holder which is attached to the said or other union transverse bars, which are secured to the revolving toothed rims above mentioned. By this latter means the pipes may be cut to any length that is found necessary and at the locality of their final position. Further, by means of suitably-formed tools the edges of the pipes may be finished off with a clean and smooth cut and scraped or cleaned at such parts on their outside where the lead jointing is intended to be placed.

In order that the invention may easily be explained, we will refer to the accompanying drawings, which illustrate same, and in these figures the pipe, with its junction-ring, is shown in dotted lines.

Figure 1 illustrates an end view of the appliance, while Fig. 2 shows a partial side view of same. Figs. 3 and 4 are views showing the adaptation of the machine when used as a pipe-cutter. Fig. 5 shows in detail the method of securing the sectional parts of the peripheral cogs. Fig. 6 also shows in detail the manner of securing the parts of the outer frame. Fig. 7 is a sectional detail view showing the means of adjustment for the calking-tools. These detail views are drawn to a larger scale than the other figures.

In the figures, 1 and 2 represent the pipes whose lead joint, as 3, is being calked, while 4 denotes the junction-ring.

The machine is preferably operated by an electric motor, as 5, which imparts motion to the spindle 6, on which is keyed a worm-wheel, as 7, and thereby motion is given to the helical toothed wheel 8, that is mounted on the transverse shaft 9. This latter shaft also carries a worm-wheel, as 10. The worm-wheel 10 engages a second worm-wheel 10'. On the shaft 11 of this latter wheel are keyed the two cog-wheels 12, which engage with the peripheral toothed rims, as 13. These geared or toothed rims 13 are formed with a suitable flange 13', which acts as or forms a running path for the friction or guide rollers 14 for carrying and holding the geared rim 13 in its correct working position during its rotation around the pipe-main. These friction-rollers 14 are mounted on the spindles 15, which run in the brackets 16. Such brackets may be cast onto the circular frames 21, hereinafter referred to, of the machine. The toothed rims 13 are preferably made in two parts, being secured together, as is clearly shown in Fig. 4. On such rims are formed the flanges 17, through which the cotter-pin 18 extends, and such pin is secured by its cotter 19, swung on the pin 20, as shown. The circular frames 21 of the machine are also preferably made in two sections, the respective parts being secured together by the cotters 22 and the check-plates 23, as clearly shown in Fig. 6. These frames 21 are held together by the transverse stays 24, and the rims 13 are also stayed in similar manner, in which case the stays are bolted to the inner or under side of the rim. To impart the inwardly-directed compression onto the calking-rollers, we employ the transverse bar 25, having at each respective end a right and left handed screw-thread, by which means the working of the calking-rollers is adjusted. This bar has a central hexagon formation, as 26, in which are holes 27, made at right angles to each other, to receive the turning bar for adjustment purposes. As the calking process proceeds the slack on the tools is taken up, so that an effective compression action is maintained. The bar 25 at its terminations screws into correspondingly-threaded blocks 28. These blocks work in the guide-brackets 29, formed on the rims 13. These blocks 28 carry the calking-tools 30, which are preferably in the form of milled or such like rollers. In order that such rollers may be held in their position during the time that the machine is being shifted from one joint to another, we form a slight curved recess on their axes 31, so as to receive holding-pins 32. In order to keep the calking-tools well home to their work and in a line radial to the center of the pipe and at same time impart a resiliency, we employ a spring-plate, as 33, which is secured to the extensions 34 of the brackets 29. This spring-plate holds the set-screw 35, which pinches on the tool-bar 25 and so imparts radial tension thereto—that is to say, the blocks 28 are free to move radially in the brackets 29, as will be clear from an inspection of Fig. 1, and the spring-plates 33 merely apply an inwardly-directed pressure to the bar 25 as a whole, together with the blocks 28 and tools.

Referring to Figs. 3 and 4, 36 represents the transverse bar, which carries the holder or rest 37, in which is secured the pipe-parting or other tool, as 38, and such tool is radially adjusted by the screw-head 39.

In order that the cutting-tool may operate at any point between the gear-rims 13, the tool-rest 37 is moved lengthwise along the bar 36 and held thereon by the pinch-screw 40 at any desired position, which latter screw determines the transverse adjustment of the tool 38.

It is obvious that the shape of the tools may be altered to suit the duties necessary to be performed, such as scraping, bell-mouthing, and such like. Further, any number of tools may be used and arranged so that they will follow in each other's paths, and thus obtain a more speedy result.

The method of using this invention is mainly as follows: The pipes, as 1 and 2, are placed in position, and the lead 3, which forms the joint, run in between such pipes and the junction-ring 4. The appliance is then placed in position on the pipes and its parts secured together by the cotters 22. The toothed rims 13 are also jointed together by their cotter-pins, as 18. The necessary operative motion being imparted by the motor 5 and chain of gearing 6 to 12, the geared rings 13 are rotated, which carry the calking-rollers 30, and these travel over and press in the lead jointing to the required degree, pressure being imparted thereto by means of the right and left threaded bar 25, such compression being exerted from opposite points, but inwardly directed onto the lead jointing, with the result that after a few travels of the calking-tools around the joint the latter is made securely tight at both of its edges and to such a degree as may be found to be necessary by means of the compression mechanism denoted by the parts 25 to 31, as before mentioned. The bar 25 is then released or unscrewed and the machine dismantled for use on the next joint. It is obvious that this calking-machine is usable for all kinds of pipe-joints which are made of lead or such like analogous soft metal, such as is generally used for jointing purposes.

When the machine is required to be used as a pipe-cutter, the calking-tools may be removed or allowed to run idle. The parting or other tool, as 38, is fed by its screw 39 onto the pipe at the point where it is desired to operate, and the revolving of the machine and the feed-pressure on the tools is maintained concurrently until such time as the pipe is cut or parted asunder or scraped, as the case may be.

Having fully described our invention, what we claim, and desire to secure by Letters Patent, is—

1. In combination in a calking-machine, a pair of rings adapted to surround the pipes to be joined, means for rotating said rings simultaneously, presser-disks arranged in pairs, carried by the rings and means for forcing said disks toward each other, substantially as described.

2. In combination in a calking-machine, a frame adapted to surround the pipes to be joined, a pair of rings guided thereby, means for rotating said rings, transverse ways carried by the rings, presser-disks, blocks forming bearings for the shafts of the same guided in said ways and means for adjusting said disks toward each other, substantially as described.

In witness whereof we have hereunto set our hands in presence of two witnesses.

JAMES COUSTON.
JAMES FINLAYSON.

Witnesses:
 RICHD. SPARROW,
 FRED. WALTHAM.